J. T. DAVIS.
LUBRICATOR FOR JOURNAL BEARINGS.
APPLICATION FILED NOV. 10, 1910.
1,012,333.
Patented Dec. 19, 1911.
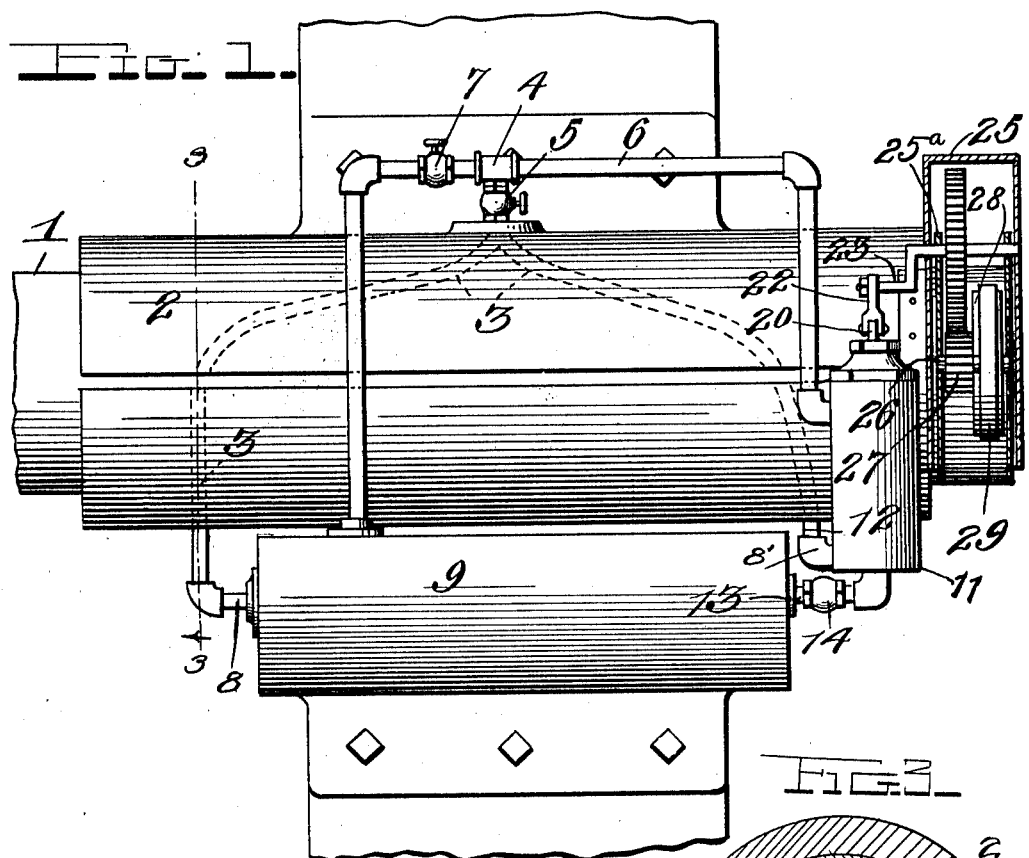
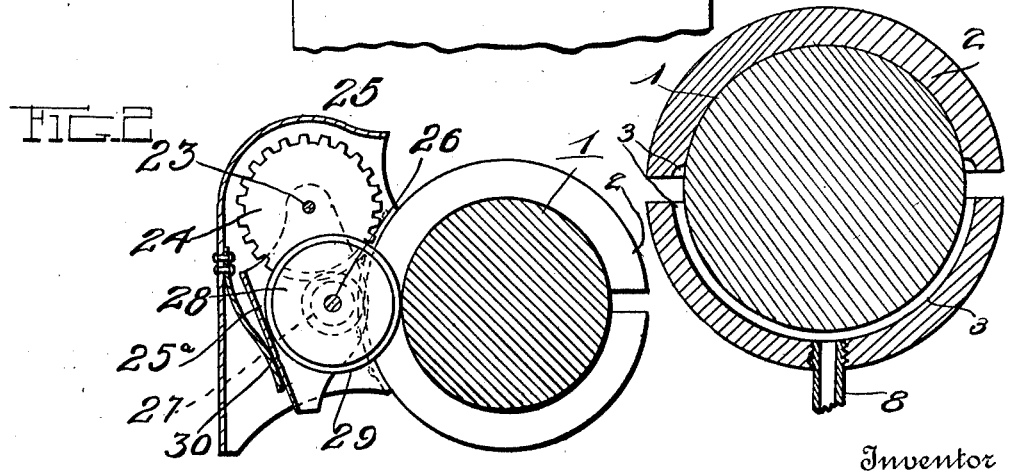
Witnesses
Chas. L. Griesbauer.
O. B. Hopkins
Inventor
J. T. Davis,
by H. B. Willson & Co.
Attorneys

UNITED STATES PATENT OFFICE.

JOHN T. DAVIS, OF ARGENTA, ARKANSAS.

LUBRICATOR FOR JOURNAL-BEARINGS.

1,012,333.  Specification of Letters Patent.  Patented Dec. 19, 1911.

Application filed November 10, 1910. Serial No. 591,650.

*To all whom it may concern:*

Be it known that I, JOHN T. DAVIS, a citizen of the United States, residing at Argenta, in the county of Pulaski and State of Arkansas, have invented certain new and useful Improvements in Lubricators for Journal-Bearings; and I do declare the following to be a full, clear, and exact description of the invention, such as will enable others skilled in the art to which it appertains to make and use the same.

This invention relates to improvements in lubricating devices for journal bearings.

One object of the invention is to provide a lubricating device of this character having an improved means for forcing and circulating the oil through the bearing thereby keeping the shaft continuously lubricated.

With these and other objects in view, the invention consists of certain novel features of construction, combination and arrangement of parts as will be more fully described and particularly pointed out in the appended claims.

In the accompanying drawings: Figure 1 is a side view of a journal bearing showing the application of my improved lubricating mechanism; Fig. 2 is a cross sectional view of the same; Fig. 3 is a cross sectional view on the line 3—3 of Fig. 1.

Referring more particularly to the drawings; 1 denotes the shaft and 2 the journal box. In the inner side of the journal box are formed curved oil conducting grooves or channels 3 which connect at the center of the top of the journal with a nipple 4 in which is arranged a globe valve 5. The nipple 4 is connected by a T coupling with an oil conducting pipe 6 which extends in opposite directions from the nipple as shown. In one branch of the pipe 6 is arranged a globe valve 7.

The groove or channel 3 connects at the under side of the journal and near one end of the same with an oil supply pipe 8 which communicates with one end of an oil reservoir 9. The groove or channel 3 connects at its opposite end with the lower end of the cylinder 11 of an oil circulating pump 12. This end of the reservoir 9 is connected by a pipe 13 with the lower end of the pump cylinder 11 and in the connecting pipe 13 is arranged a check valve 14 whereby the oil drawn from the reservoir is prevented from reëntering the same, at this end.

The branch of the oil conducting pipe 6 having the globe valve 7 connects with the upper side of the reservoir near one end thereof while the opposite branch of the pipe 6 connects with the upper end of the pump cylinder 11 as shown.

Oil will be drawn into the pump cylinder 11 from the reservoir or tank 9 and from the connected lower end of the groove or channel 3 through pipe 8' when the pump piston is drawn up or outwardly and on the return or down stroke of the piston the oil thus drawn into the cylinder will be forced through the ports in the piston and into the opposite end of the cylinder. On the next upstroke of the piston this oil will be forced into the connected end of the oil conducting pipe 6 and by the same conducted to the upper portion of the oil circulating grooves 3 and thus applied to the journal. The surplus oil from said grooves passes back to the tank 9 through the pipe 8 and to the pump through pipe 8'. The valve 5 is adjusted to permit the desired amount of oil to be fed therethrough to the journal and the valve 7 is opened wide to permit the surplus oil drawn by the pump from the tank to pass back to the tank. Should valve 7 be closed the oil would be forced through valve 5 and flood the bearing.

A piston rod 20 works through a stuffing box 21 on the upper end of the cylinder 11 and is connected by a pitman or connecting rod 22 with a crank shaft 23 which is operatively connected to a spur gear 24. The shaft 23 is revolubly mounted in a suitable housing 25 secured to the journal box and which incloses the gear 24. In the housing 25 and pivotally mounted on the crank shaft 23 is a shaft supporting frame or hanger 25ª in which is revolubly mounted a drive shaft 26 having fixedly mounted thereon a combined spur gear pinion 27 and friction drive gear 28. The pinion 27 is in operative engagement with the gear 24 on the crank shaft 23 while the friction gear 28 has a frictional engagement with and is driven by the revolving shaft or journal 1 whereby the movement of said shaft is imparted to the crank shaft and through the same to the pumping mechanism of the lubricator. The friction gear 28 is preferably grooved to receive a friction band 29 of leather or other suitable material by means of which a better frictional engagement with the journal 1 is obtained. The gear 28 is held in operative engagement with the journal 1 by means of a flat spring 30 which is arranged in and secured to the inner side of the housing 25 and bears against the frame or hanger 25ª thus projecting the same forwardly and holding the friction gear 28 in engagement with the journal 1 as clearly shown in Fig. 2 of the drawing.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

In a lubricator for journal bearings, a reservoir, valved oil conducting and return pipes to connect said reservoir with the journal bearings, a pump, valved conducting and return pipes to connect said pump with the reservoir and with said bearing, a housing secured to the bearing, a crank shaft revolubly mounted in said housing and operatively connected with said pump, a hanger loosely connected to said crank shaft, a driving shaft mounted in said hanger, a combined spur gear pinion and friction gear mounted on said drive shaft, said pinion having an operative engagement with the gear on said crank shaft, and a spring arranged in said housing and engaging said hanger whereby said friction gear is held in operative engagement with the shaft in the journal bearing.

In testimony whereof I have hereunto set my hand in presence of two subscribing witnesses.

JOHN T. DAVIS.

Witnesses:
 JAMES H. LEWIS,
 J. O. DE SONCHA.

Copies of this patent may be obtained for five cents each, by addressing the "Commissioner of Patents, Washington, D. C."